Figure 2:
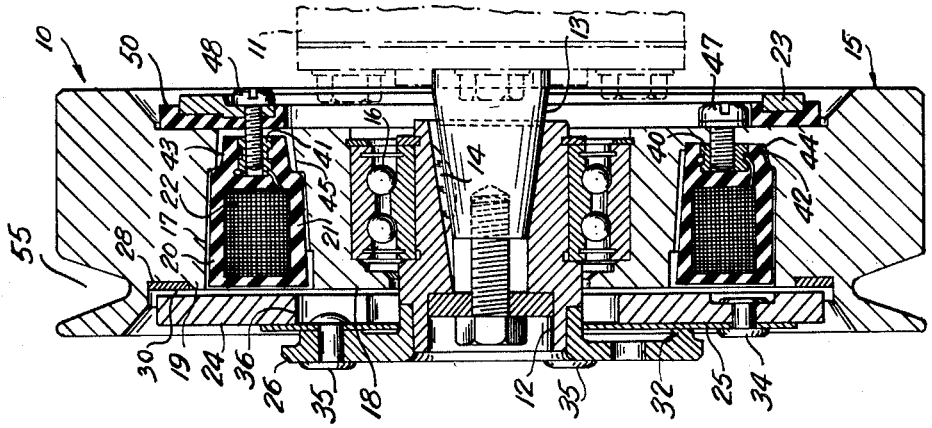

Dec. 22, 1964 W. E. SALA 3,162,285
ELECTRO-MAGNETIC CLUTCH WITH MOLDED COIL UNIT
Filed May 28, 1959 3 Sheets-Sheet 1

INVENTOR.
WILLIAM E. SALA
BY Hudson, Boughton,
Williams, David & Hoffman
ATTORNEYS Dec. 22, 1964  W. E. SALA  3,162,285
ELECTRO-MAGNETIC CLUTCH WITH MOLDED COIL UNIT
Filed May 28, 1959  3 Sheets-Sheet 2
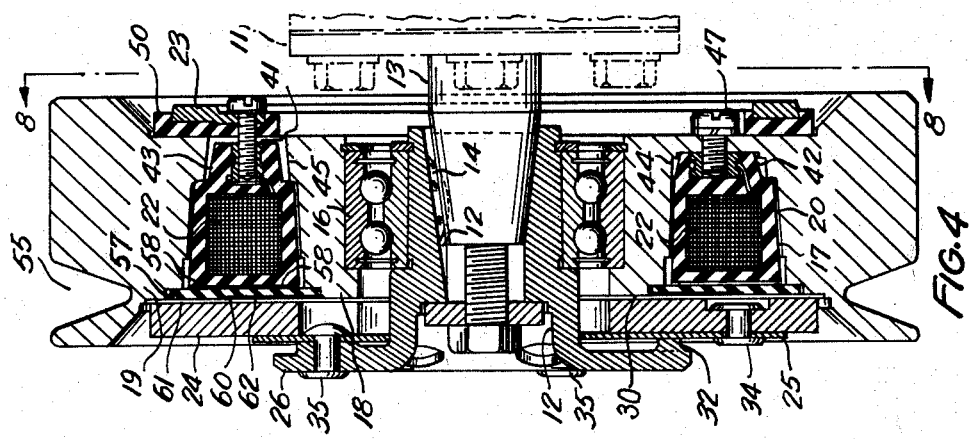
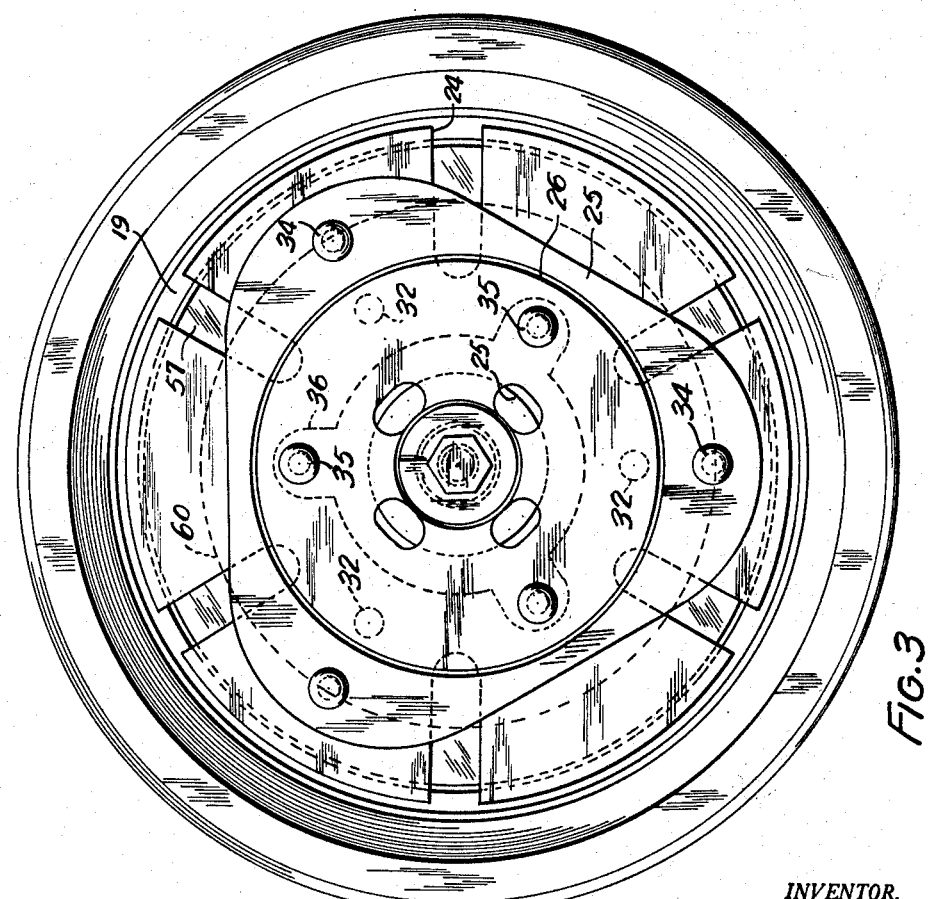
INVENTOR.
WILLIAM E. SALA
BY
ATTORNEYS Dec. 22, 1964  W. E. SALA  3,162,285
ELECTRO-MAGNETIC CLUTCH WITH MOLDED COIL UNIT
Filed May 28, 1959  3 Sheets-Sheet 3

INVENTOR.
WILLIAM E. SALA
BY Hudson, Baughton,
Williams, David & Hoffmann
ATTORNEYS

United States Patent Office

3,162,285
Patented Dec. 22, 1964

3,162,285
ELECTRO-MAGNETIC CLUTCH WITH MOLDED COIL UNIT
William E. Sala, Lyndhurst, Ohio, assignor to Eaton Manufacturing Company, Cleveland, Ohio, a corporation of Ohio
Filed May 28, 1959, Ser. No. 816,446
4 Claims. (Cl. 192—84)

This invention relates to magnetic drive devices, and more particularly to electro-magnetically energizable rotary clutches having as an object the provision of novel and effective constructions for supporting a movable armature or clutch member in a predetermined position with respect to a rotary member engageable thereby without the use of adjustable means.

As another object this invention provides a magnetic clutch having driving and driven members including a hub adapted to rotate about an axis and a rotatable magnet frame coaxially arranged therewith, an armature ring or clutch member connected by a generally flat polygonal spring to the hub and permitted thereby to move toward and away from the magnet frame between released and engaged positions, the hub being secured to the spring at circumferentially spaced points and having staggered, axially extending, lugs or projections bearing against the spring maintaining it in a stressed condition, thereby minimizing vibration and predetermining the released position of the armature member and its spacing from the magnet frame.

Another object of the invention is the provision of a novel magnetic drive device having a magnet frame and an electro-magnetic coil means associated therewith, the coil means having a molded insulation thereabout, and having conductive connection with threaded ferrules embedded in the insulation and forming projections therewith, the projections cooperating with recesses in the magnet frame to prevent relative rotation therebetween and the ferrules co-operating with screws or the like to secure the coil means in the magnet frame and to establish electrical connection with the coil means.

A further object is the provision in a magnetic drive or clutch of friction facing means engageable by an armature or clutch element movable under the influence of magnetic coil means, and which friction facing means is provided with stepped surfaces so that the engagement thereof by said armature means will occur first at the outermost edge thereof, thereby achieving a more efficient and effective frictional engagement than has been normally experienced heretofore and with a minimum of friction facing material.

As an additional object the invention aims to provide a clutch employing a movable armature or clutch member adapted to be shifted into engagement with a friction facing carried by a magnet frame or pole structure under the influence of an encapsulated electric coil means, there being provided slip ring means mounted on the magnet frame and insulated therefrom, and wherein the magnet frame, coil means, and slip ring means are maintained in assembled relation by means which also establish the electrical connection therebetween, and in which the encapsulating insulation of the coil means may be formed integrally with the friction facing.

Figure 1:
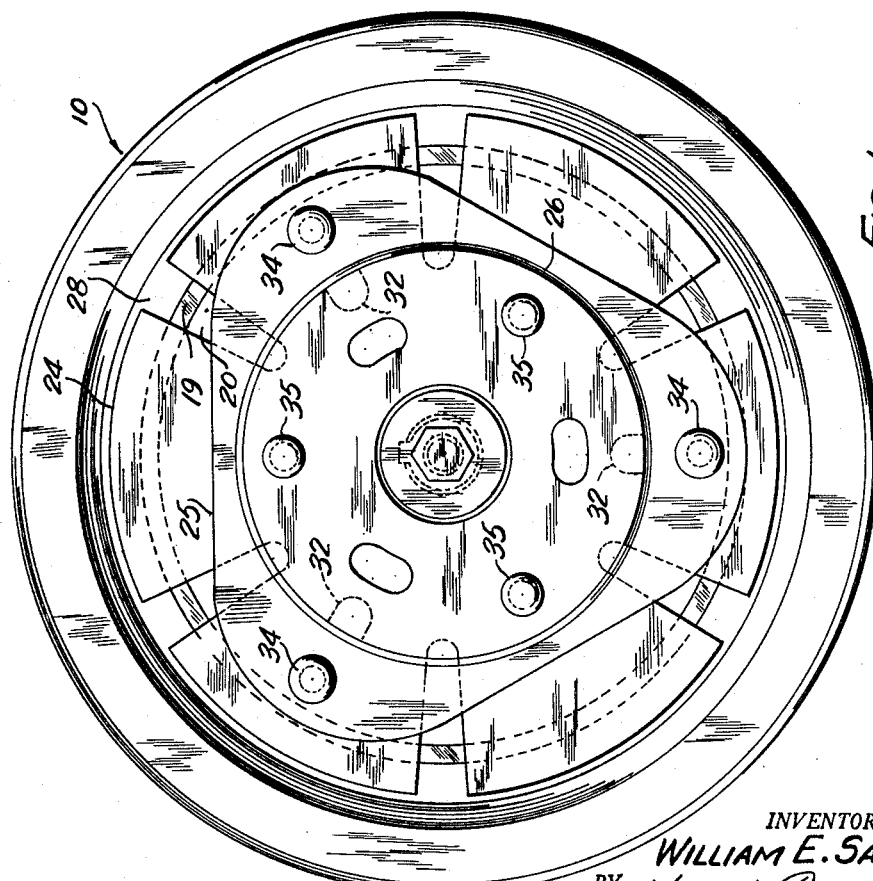
Figure 6:
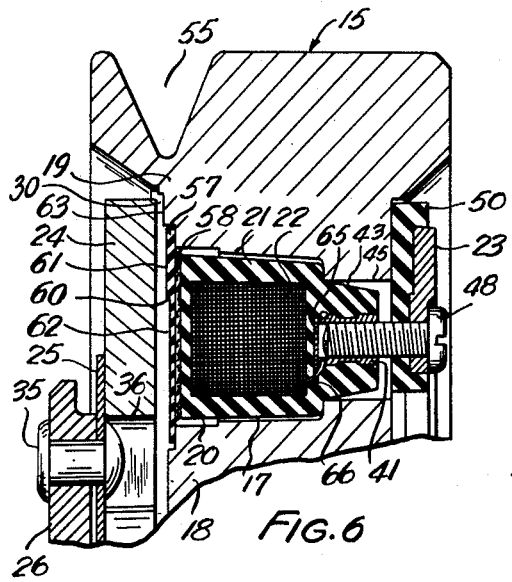
Figure 7:
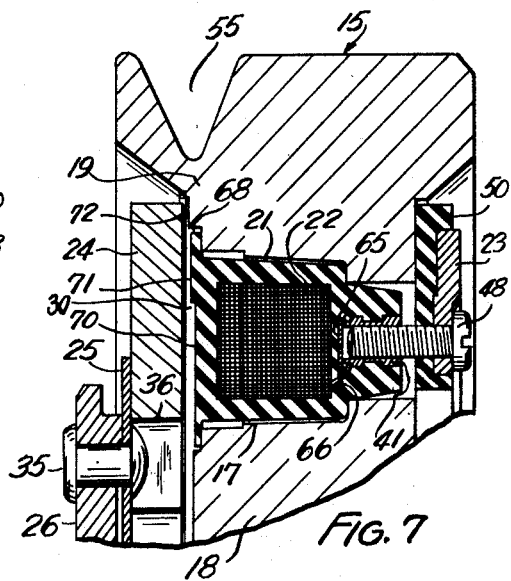
Figure 9:
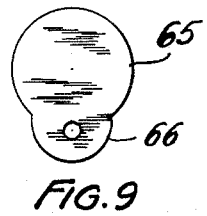
Figure 8:
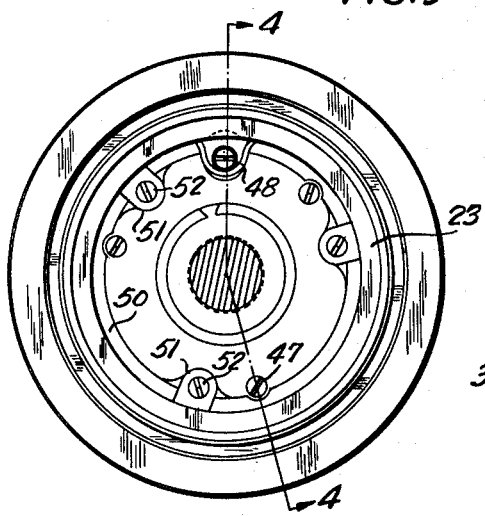
Figure 5:
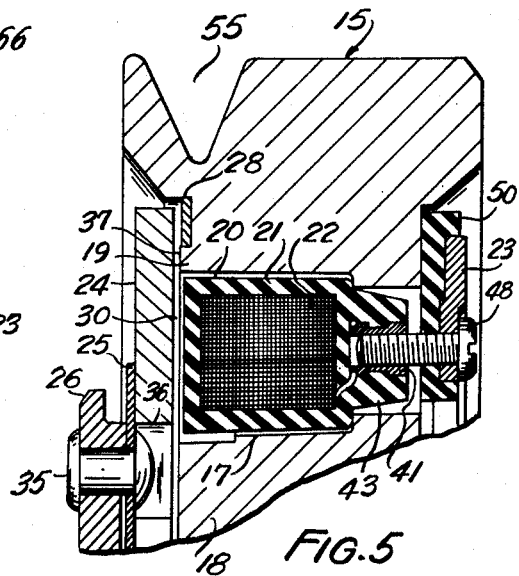

Further objects and advantages of the invention will become apparent from the following description of exemplary structures wherein the invention resides, taken in conjunction with the accompanying sheets of drawings forming a part of this specification, and in which:

FIG. 1 is a front elevation of a presently preferred form of clutch or magnetic drive device embodying the invention, FIG. 2 is a sectional view of the clutch of FIG. 1 taken along a line through the center thereof, FIG. 3 is a front elevation of a modified form of clutch embodying the invention, FIG. 4 is a sectional view of the modified clutch of FIG. 3 taken along a line through the center thereof, FIG. 5 is a sectional view on an enlarged scale illustrating a portion of one form of friction facing and the mounting arrangement of the coil and slip ring means, FIG. 6 is a view similar to FIG. 5 but illustrating a form of friction facing and coil insulation wherein the two are bonded by an adhesive, FIG. 7 is another view similar to FIG. 5 but illustrating a modified form of friction facing, and coil insulation wherein the two are integrally molded of the same material, FIG. 8 is a rear elevation on a reduced scale of a clutch embodying the invention, and FIG. 9 is a plan view of an insulating element.

One preferred form of magnetic drive device or clutch 10 embodying this invention is illustrated in FIGS. 1, 2 and 5, and finds application in driving association with auxiliary devices such as an air conditioner compressor 11 or the like, powered from an automobile engine.

The clutch 10 has a hub 12 adapted to be received directly on the shaft 13 of the compresosr 11 or other auxiliary device, the shaft being secured for rotation therewith by a key 14. A rotary field magnet frame or pole structure 15 is mounted for rotation coaxially with respect to the hub 12 as by suitable bearings 16.

The magnet frame 15 has an annular groove 17 defined therein between axially extending inner and outer annular pole portions 18 and 19. Disposed in the groove 17 between the pole portions 18 and 19 is an insulated electro-magnet coil means 20, the insulation 21 thereof being preferably molded about the wire coil 22 to form a unitary and encapsulated coil structure. A slip ring 23 is arranged in substantially coaxial relation with the magnet frame 15, and co-operates with a brush (not shown) to supply electric current to the coil 22 for energization thereof.

A ring-like armature or clutch member 24 is secured to a generally flat, spring means 25 of polygonal shape, the spring 25 being in turn secured to a flange 26 forming a part of the hub 12. Friction facing means in the form of an annular lining or facing 28 is mounted wholly on the outer pole portion 19 of the magnet frame 15 and is undercut or recessed with respect thereto for purposes more fully explained hereafter.

By virtue of the resilient flexibility of the spring 25, which in this instance is substantially triangular in shape, and under the influence of flux generated in the magnet frame 15 and the armature ring 24, the latter is movable toward and away from the magnet frame 15, and the friction facing 28, between released and engaged positions with respect thereto.

When the armature ring 24 is in its just mentioned released position, it is desirably in spaced relation to the pole structure or magnet frame 15 to eliminate frictional drag. The space or air gap 30 therebetween is, however, advantageously held to a small dimension to assure an effective flux path which is necessary to an efficient and smoothly operating clutch device. The clutch 10 of this invention is therefore provided with means for predetermining the air gap 30 within effective limits without the use of adjusting means such as shims or screws, the means including in a novel arrangement the spring 25 and co-operating button-like projections 32 extending axially from the flange 26 of the hub 12 and bearing against and stressing the spring.

The clutch member or armature ring 24 may be segmented in its peripheral portions as illustrated in FIG. 1, and is secured to the triangularly shaped spring 25, at the corners thereof extending beyond the flange 26, by a plurality of circumferentially spaced fasteners such as rivets 34 or the like, three such rivets being used in this instance. The spring 25, which may be laminated in character, has a central opening receiving the hub 12, and is in turn fastened or riveted to the flange 26 of the hub 12 by circumferentially spaced rivets 35, the armature having arcuate cut outs 36 to clear the heads thereof.

The projections 32 are circumferentially staggered in relation to the rivets 35 and are positioned outwardly of those rivets. The projections 32 have the same circumferential angular spacing as the rivets 34 and are spaced radially inwardly therefrom. The size of the projections 32 is such that these elements bear against the spring 25 placing it under a slight distorting stress and thereby displacing the armature 24 axially toward the magnet frame 15. By reason of the deflection of the spring 25 and the location and size just described for the projections 32, these projections serve to prevent vibration of the spring 25 when the armature 24 is in released condition. The projections 32 also serve the function of positioning the armature 24 to define a predetermined width for the air gap 30.

The friction facing or material 28, which is adapted to be engaged by the clutch member or armature 24, is recessed into the outer pole portion 19 of the magnet frame 15, and is wholly disposed in that outer pole portion. By being so placed the friction facing, through narrow, because of its large diameter presents an effective amount of friction area. Likewise, because of the large diameter the greatest effective lever arm, or moment of force, is obtained for the area of friction facing used.

Additionally, and as best seen in FIG. 5, the friction facing 28 is undercut with respect to the surface 37 of the pole portion 19 making it necessary for the armature 24 to wear down that pole surface before contacting the friction facing 28, the two then being worn in unison. The friction of the metal-to-metal engagement between the armature 24 and the surface 37 serves to transmit torque under a slipping condition which prevails during a run-in period or initial operating period for the device. Because of this slipping condition, the wearing of the metal surface 37 will occur relatively rapidly during such a run-in or initial operating period. The metal of the pole portion thereafter guards against excessive and rapid wear of the facing 28, while the facing provides the necessary friction against relative sliding movement between the armature and the pole portion after engagement.

Inasmuch as the effectiveness and efficiency of the clutch 10 are related to the length and material of the flux path, the above described position and arrangement of the friction facing 28 provides a further advantage in that it places the coil 22 as close as possible to the armature ring 24 while obviating the necessity of passing the flux through a friction facing in its course between the pole portions 18 and 19 and the armature ring 24.

The annular coil means 20 and the slip ring 23 are structurally and electrically united and mounted on the magnet frame 15 in a particularly effective manner, lending a simplicity and ruggedness to the clutch device together with ease in manufacture and assembly of the parts thereof. To these ends the coil 22 is encapsulated in an insulating covering 21 which may advantageously be an epoxy resin molding material, and threaded ferrules are provided as at 40 and 41, the ferrules being embedded in the insulation 21.

About each ferrule such as 40 and 41 a boss or projection 42 or 43 is formed of the coil covering material 21, the bosses being received in complementary recesses or openings 44 and 45 in the magnet frame 15. The bosses and recesses cooperate to prevent relative rotary motion between the coil means 20 and the magnet frame 15, while the ferrules co-operate with screws 47, 48 to tightly secure the coil means in the groove 17.

Two of the ferrules, 40 and 41, electrically connect the wire coil 22 to the magnet frame 15 as a ground and to the slip ring 23, respectively. The opposite ends or leads of the coil 22 are conveniently wrapped around the ferrules 40 and 41 and are conductively secured thereto as by soldering or the like.

The slip ring 23 is insulated from the magnet frame 15 by a ring 50 of insulating material in which the slip ring is recessed. The insulating ring 50 has inwardly projecting ears 51 through which screws 52 extend (see FIG. 8) to secure the insulating ring 50, and the slip ring 23 recessed therein, to the magnet frame 15.

A groove 55 is defined in the periphery of the magnet frame 15 whereby the magnet frame serves as a sheave or pulley for rotation by a belt driven by an automobile engine or the like. It will be observed that the magnet frame 15 serves not only as a pulley but as a flywheel, including as a rotating mass the field coil means 20 and slip ring means 23.

A modified form of clutch embodying the invention is illustrated in FIGS. 3, 4, and 6, wherein the hub 12 and flange 26 thereof are integrally formed as a single element, and wherein the friction facing, here indicated at 57, is secured or bonded by a suitable adhesive 58 such as an epoxy resin to the encapsulating insulation 21 of the coil 22.

As may best be seen in FIG. 6, the friction facing 57 of this modification is undercut or stepped at 60 forming an outer annular surface 61 projecting axially toward the armature 24 and above an inner annular surface 62. The armature 24 must therefore first frictionally contact the outer annular surface 61 establishing a more effective moment or lever arm than would be experienced if the frictional contact were evenly distributed across both faces 61 and 62. The friction facing surface 61 will likewise be seen to be undercut or recessed with respect to the surface 63 of the pole portion 19. The armature ring or clutch element 24 must wear the metal surface 63 down before contact with the friction facing 57 will be made. As explained with reference to the embodiment of FIG. 1, the rate of wear of the friction facing will therefore be controlled.

As a further measure in providing a coil 22 which is effectively protected and insulated, a flat disk-like insulator 65, illustrated in FIG. 9 and appearing in FIGS. 6 and 7, is preferably embedded beneath each of the threaded ferrules such as 40, 41 with a wire lead of the coil passing through an eye in a projection 66 extending from each disk-like insulator. The disk-like insulator 65 will aid in preventing damage to or shorting of the coil 22 in the event a screw such as 48 is too forcibly or deeply inserted.

Another embodiment of the invention is illustrated in FIG. 7 and is distinguished from the embodiment just described in that a friction facing 68 is formed integrally with, and of the same material as, the insulation 21 in which the coil 22 is encapsulated or embedded. The facing 68 otherwise resembles the facing 57 in that it is provided with stepped inner and outer surfaces 70 and 71 respectively, and is recessed or undercut with respect to a surface 72 of the pole portion 19.

From the foregoing description and the accompanying drawings it will now be readily understood that there has been provided by this invention a magnetic drive means having novel but effective armature positioning means, and in which the armature or clutch member is enabled to be engaged in a very effective manner, and also in which the assembly and arrangements of parts results in a particularly simple but rugged and reliable device.

Although the invention has been described in considerable detail with reference to several embodiments thereof, and although the invention has been referred to as useful in driving air conditioner compressors or other auxiliary devices from an automobile motor, it is understood that the invention is not limited thereby, but rather the inven- Having described my invention, I claim 1. A clutch of the type described comprising a hub member, a pole member, said hub member and pole member being relatively rotatable on a common axis, said pole member having an axially facing annular recess therein and annularly extending outer and inner pole portions on radially opposite sides of said recess and connected by rear wall means forming the bottom wall of said recess, said bottom wall having a plurality of circumferentially spaced recesses therein communicating with said axially facing annular recess, annular armature means supported by said hub member for rotation therwith and axially shiftable to and from a clutch engaged position relative to said pole member and in spanning relation to said annular recess, an annular coil unit positioned in said annular recess and electrically energizable for causing the axial shifting of said armature means to said clutch engaged position, said coil unit comprising coil means and a one-piece molded homogeneous body of set electrical insulating material having said coil means embedded therein and completely surrounded thereby, said one-piece molded homogenous body having plural boss portions received in said recesses in said bottom wall of said pole member, plural threaded metal insert fastening means embedded in said boss portions of said one-piece homogenous body and communicating with the exterior of said boss portions to receive complementary screw fastening elements, first and second of said metal inserts being electrically connected to the respective opposite leads of said coil means, means providing passages in the back wall of said pole member communicating with a plurality of said recesses and in alignment with the metal inserts in said bosses in the recesses, and screw fastening means extending through the passages in said bottom wall and into said metal inserts and supporting said coil unit in said annular recess.

2. A clutch of the type described comprising a hub member, a pole member, said hub member and pole member being relatively rotatable on a common axis, said pole member having an axially facing annular recess therein and annularly extending outer and inner pole portions on radially opposite sides of said recess and connected by rear wall means forming the bottom wall of said recess, said bottom wall having a plurality of circumferentially spaced recesses therein communicating with said axially facing annular recess, annular armature means supported by said hub member for rotation therewith and axially shiftable to and from a clutch engaged position relative to said pole member and in spanning relation to said annular recess, an annular coil unit positioned in said recess and electrically energizable for causing the axial shifting of said armature means to said clutch engaged position, said coil unit comprising coil means and a one-piece molded homogenous body of set electrical insulating material having said coil means embedded therein and completely surrounded thereby, said one-piece molded homogenous body having plural boss portions received in said recesses in said bottom wall of said pole member, plural threaded metal insert fastening means embedded in said boss portions of said one-piece homogenous body and communicating with the exterior of said boss portions to receive complementary screw fastening elements, first and second of said metal insert fastening means being electrically connected to the respective opposite leads of said coil means, means providing passages in the back wall of said pole member communicating with at least the recesses containing said first and second metal inserts with the exterior of said back wall, screw fastening means extending through the passages in said bottom wall and into said first and second metal insert fastening means and supporting said coil unit in said annular recess, slip ring means supported on said back wall, and one of said screw fastening means being connected with said slip ring means and with said first metal insert fastening means to supply energizing current to said coil and another of said screw fastening means connected with said second metal insert fastening means and with said end wall and thereby functioning to ground the other lead of said coil.

3. A clutch of the character described comprising, a hub member, a pole member, said hub member and pole member being relatively rotatable on a common axis, said pole member having an axially facing annular recess therein and annularly extending pole portions on radially opposite sides of said recess and connected by rear wall means forming the bottom wall of said recess, annular armature means supported by said hub member for rotation therewith and axially shiftable to and from a clutch-engaged position relative to said pole member and in spanning relation to said recess, a preformed annular coil unit received in said recess and electrically energizable for causing the axial shifting of said armature means toward said pole member, said hub member having a central portion and flange means projecting radially therefrom, a flat spring of a generally triangular shape having an inner portion adjacent one side of said flange means and the corner portions of said triangular shape adjacent one side of said armature means, a first group of annularly spaced fastening elements connecting said armature means with said corner portions, a second group of annularly spaced fastening elements located in a staggered relation to the fastening elements of said first group and connecting said inner portion with said flange means, and annularly spaced projections on said flange means and formed integral therewith so as to extend axially toward said pole member and being engageable as stops by said spring for holding the latter in a partially flexed condition to prevent vibration of the armature means and for limiting the movement of said armature means in a direction away from said pole member to a predetermined air-gap width, said projections being located in the spaces between the fastening elements of said second group and in a substantially radially inwardly opposed relation to the fastening elements of said first group.

4. A clutch as defined in claim 3 wherein said spring has a central opening in which the central portion of said hub is received and said spring also having an annular outer portion on which said corner portions are located.

References Cited in the file of this patent

UNITED STATES PATENTS

| | | |
|---|---|---|
| 1,479,034 | Fernow | Jan. 1, 1924 |
| 1,491,426 | Schunemann | Apr. 22, 1924 |
| 1,622,261 | Payne | Mar. 22, 1927 |
| 2,394,070 | Kerst | Feb. 5, 1946 |
| 2,684,744 | Myers | July 27, 1954 |
| 2,695,695 | Gilfillan | Nov. 30, 1954 |
| 2,738,044 | Winther | Mar. 13, 1956 |
| 2,739,683 | Gamundi | Mar. 27, 1956 |
| 2,912,963 | Dufresne | Nov. 17, 1959 |
| 2,914,156 | Harting | Nov. 24, 1959 |
| 2,973,850 | Jaeschake | Mar. 7, 1961 |
| 2,982,385 | Gamundi | May 2, 1961 |
| 3,036,680 | Jaeschke | May 29, 1962 |